United States Patent
Pofferi

[11] 3,873,219
[45] Mar. 25, 1975

[54] DEMOUNTABLE STRUCTURE
[76] Inventor: Giancarlo Pofferi, Via Chilone 14, I-00124 Casalpalocco, Rome, Italy
[22] Filed: Oct. 31, 1972
[21] Appl. No.: 302,403

[52] U.S. Cl.............. 403/171, 108/111, 211/182, 403/219
[51] Int. Cl............................................ F16b 7/00
[58] Field of Search..... 108/111; 211/182; 403/170, 403/174, 176, 178, 219, 246, 295, 171; 52/753 D, 753 C, 754, 755

[56] References Cited
UNITED STATES PATENTS

| 2,035,489 | 3/1936 | McArthur | 403/174 |
|---|---|---|---|
| 2,212,455 | 8/1940 | Reed | 403/170 X |
| 2,609,638 | 9/1952 | Lindenmeyer | 403/176 X |
| 3,254,774 | 6/1966 | Schild | 211/182 |
| 3,268,252 | 8/1966 | Rolland | 211/182 X |
| 3,636,893 | 1/1972 | Lange | 108/111 |
| 3,670,899 | 6/1972 | Kronenberg et al. | 211/182 |

FOREIGN PATENTS OR APPLICATIONS
| 1,554,362 | 11/1969 | Germany | 211/182 |

Primary Examiner—Roy D. Frazier
Assistant Examiner—William E. Lyddane
Attorney, Agent, or Firm—Hopgood, Calimafde, Kalil, Blaustein & Lieberman

[57] ABSTRACT

A demountable structure, for example for forming scaffolding, shelf assemblies or frame assemblies comprises a pair of co-axial spaced connection members with a connection element interposed between the end edges of the connection member. A screw or other means extends between the connection members and clamps the end edges thereof onto the connection element. The connection element is associated with, for example, a shelf or cross-member, and a plurality of connection elements can be collectively interposed between the connection members so as to form a connection for a plurality of concurrent cross-members or the like.

6 Claims, 71 Drawing Figures

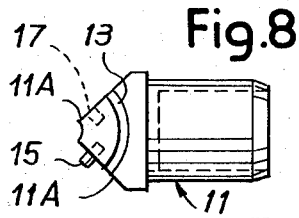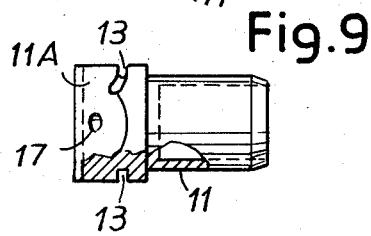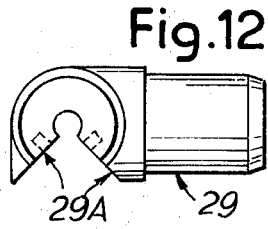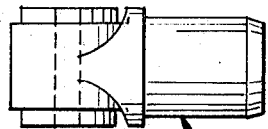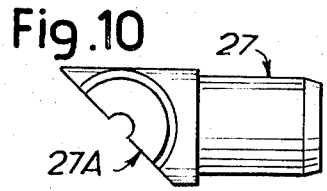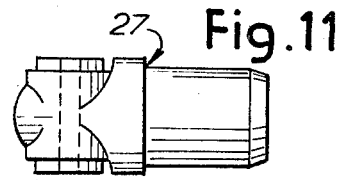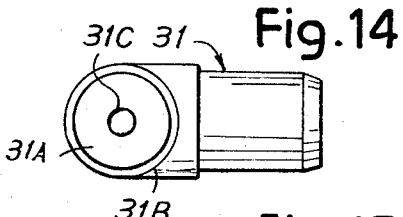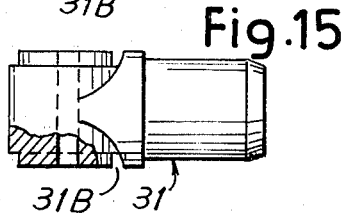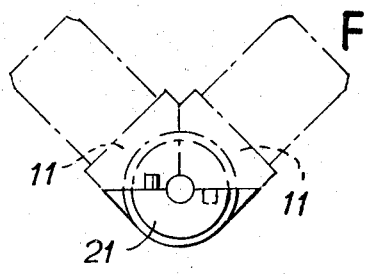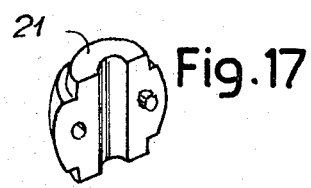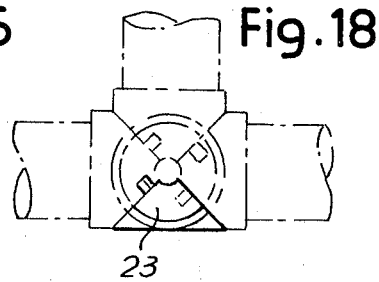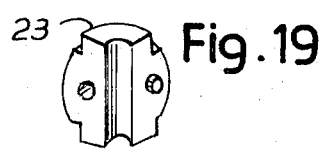

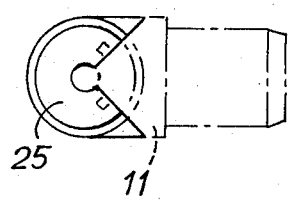
Fig.20
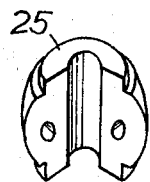
Fig.21
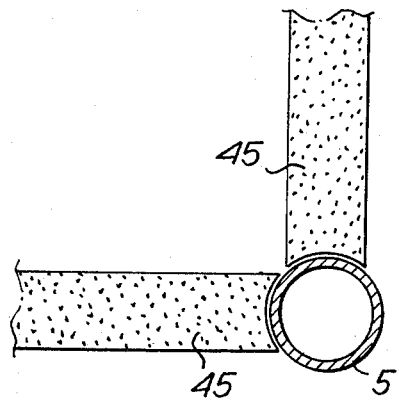
Fig.22
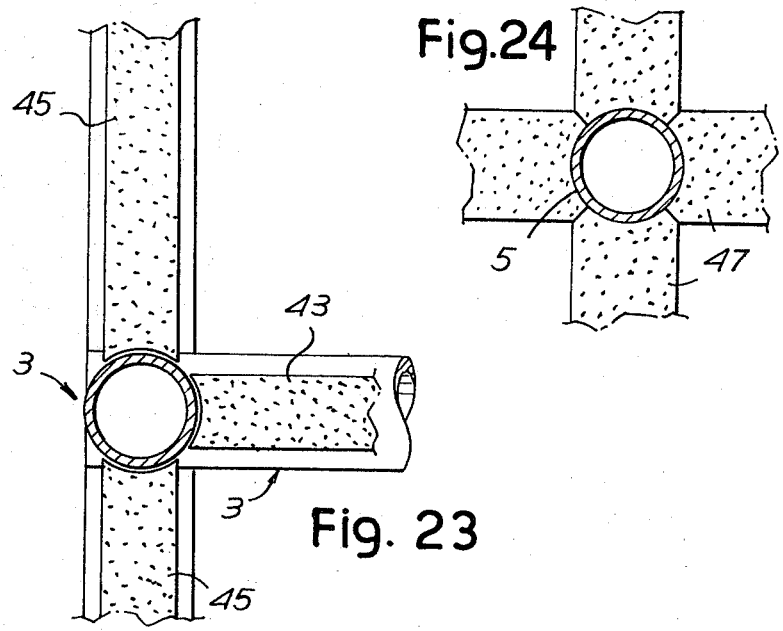
Fig.23
Fig.24

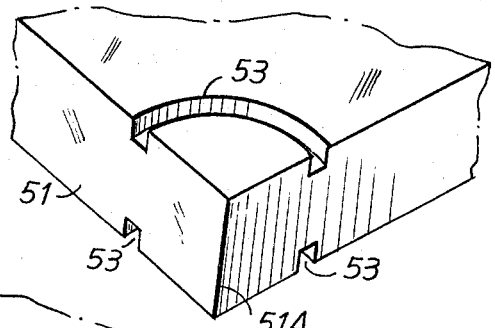
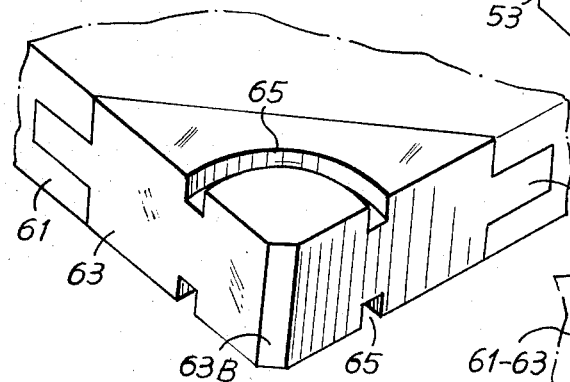
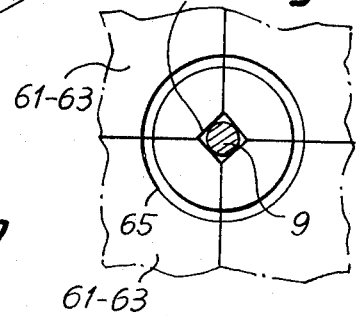
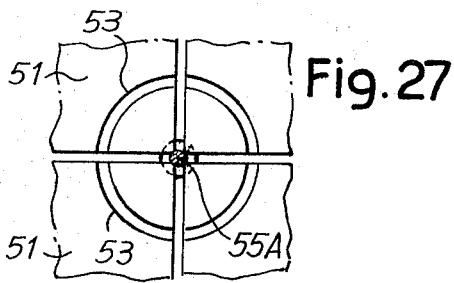
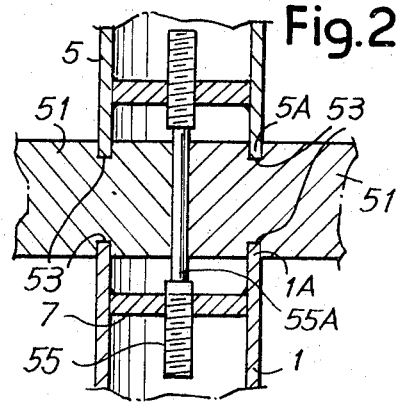
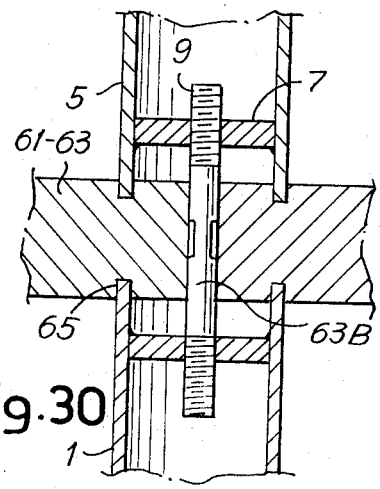

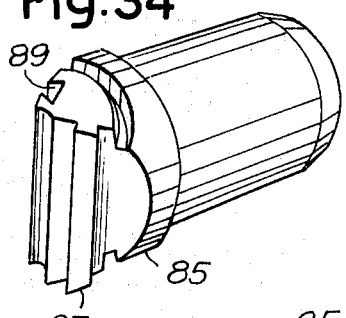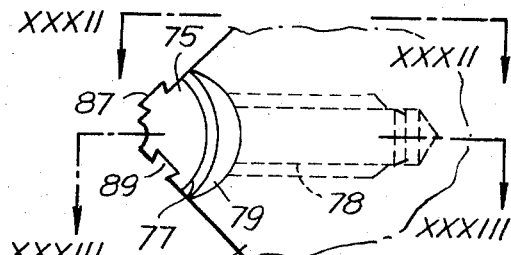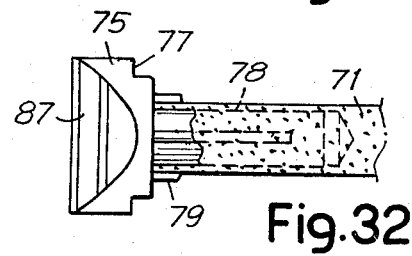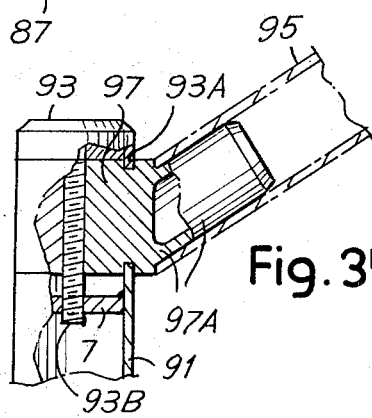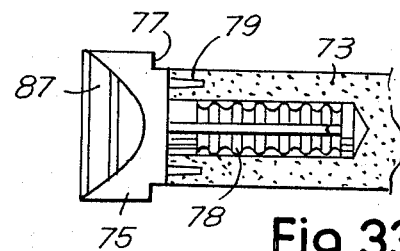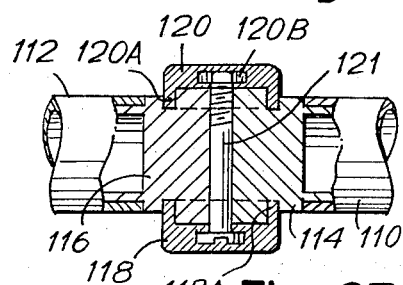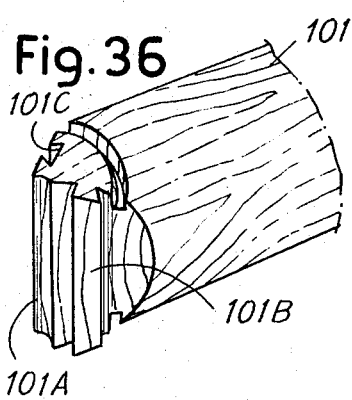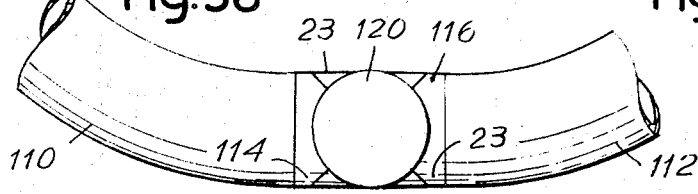

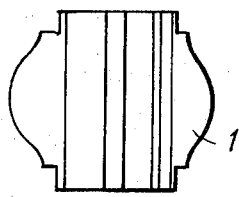
Fig.39
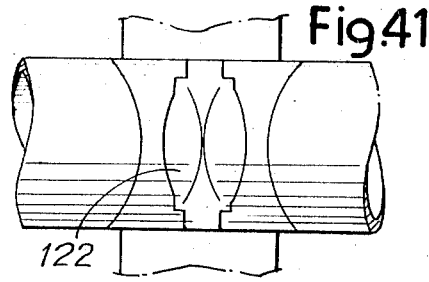
Fig.41
Fig.40
Fig.42
Fig.43
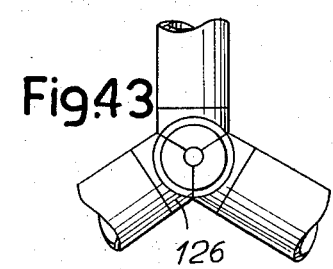
Fig.44

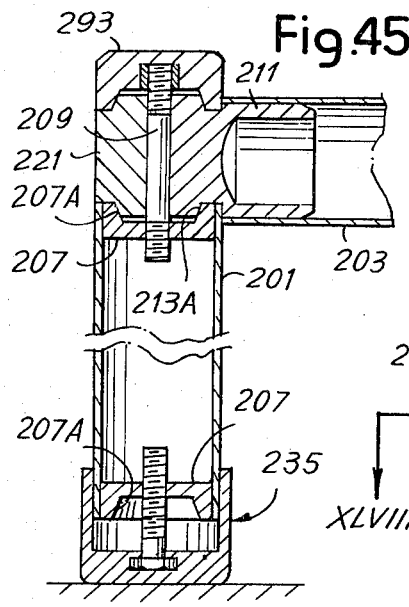
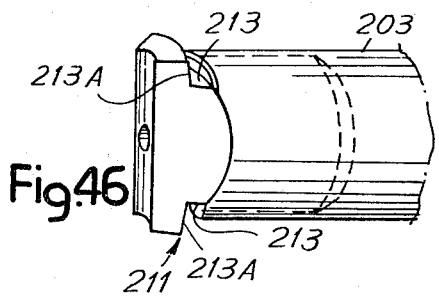
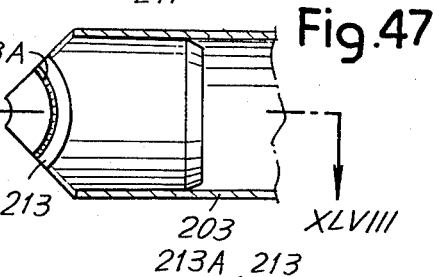
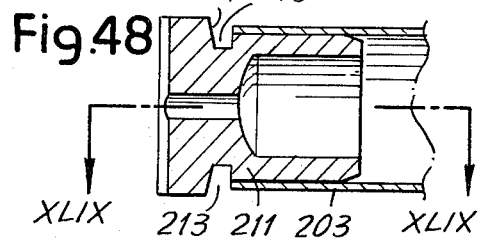
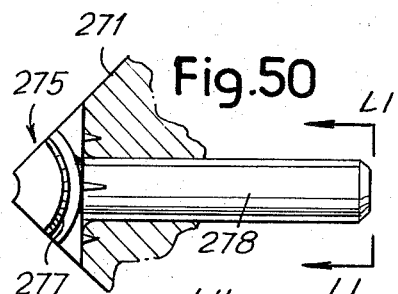
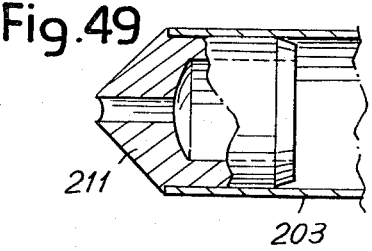
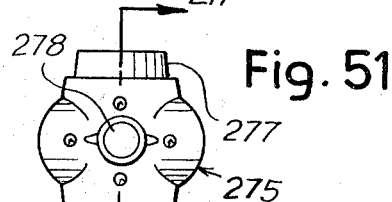
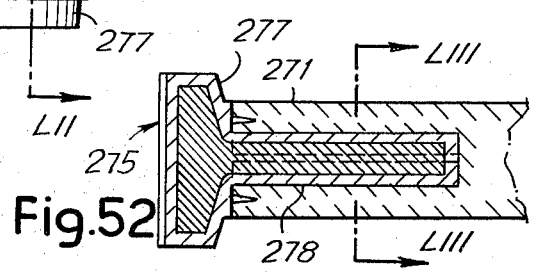
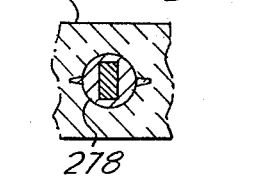

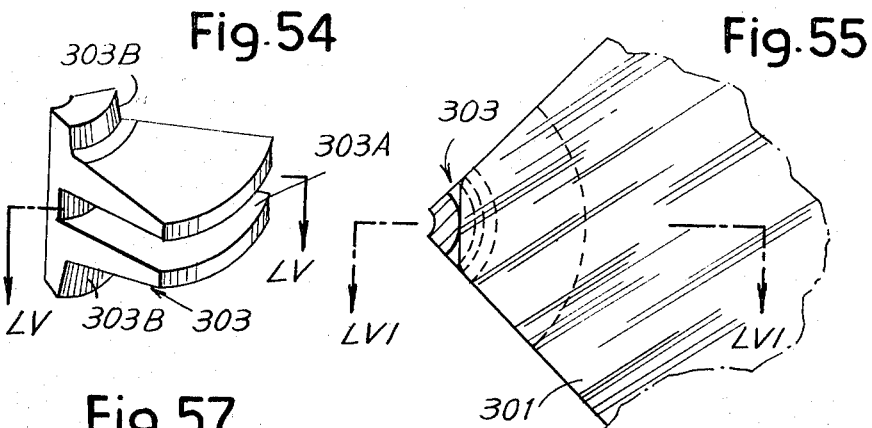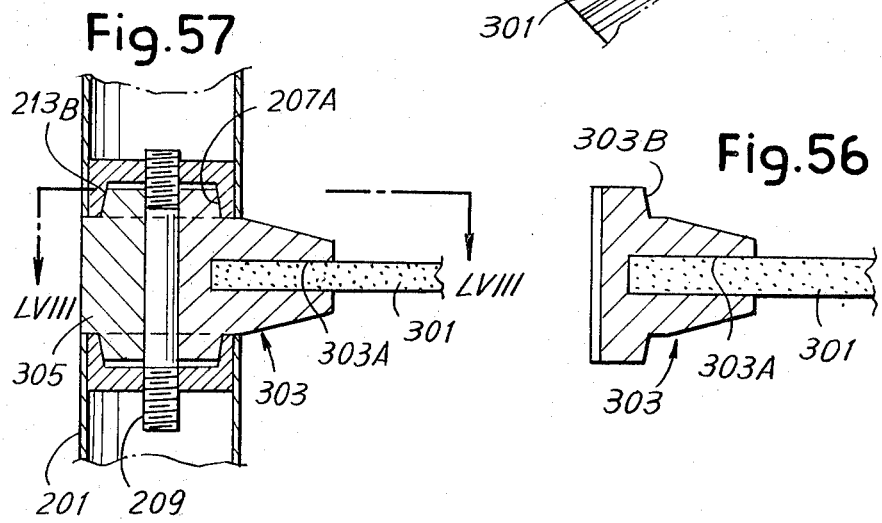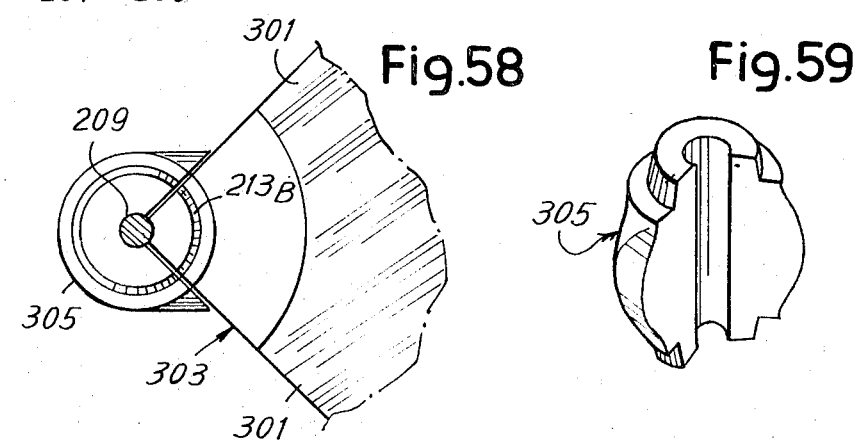

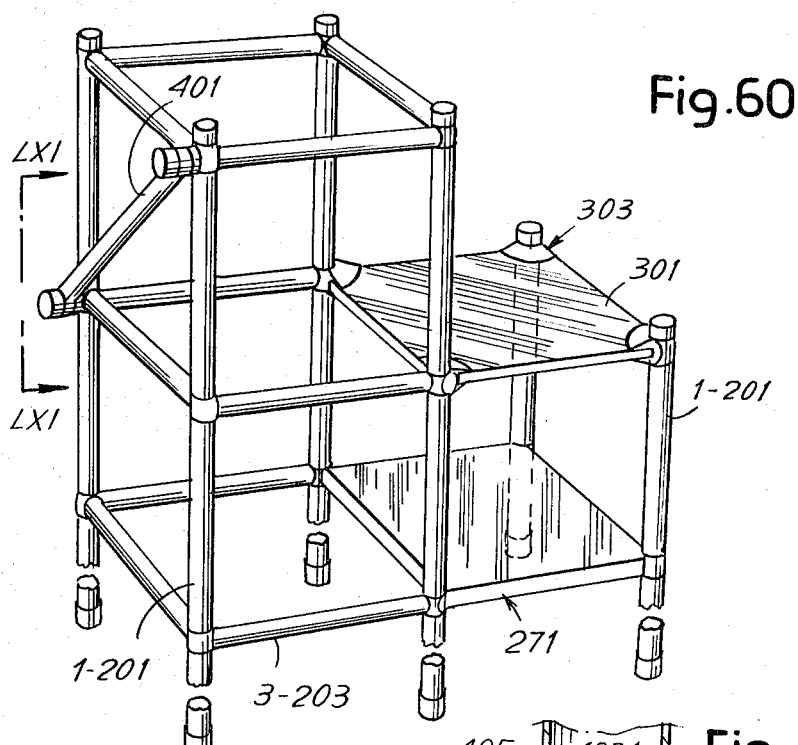
Fig. 60
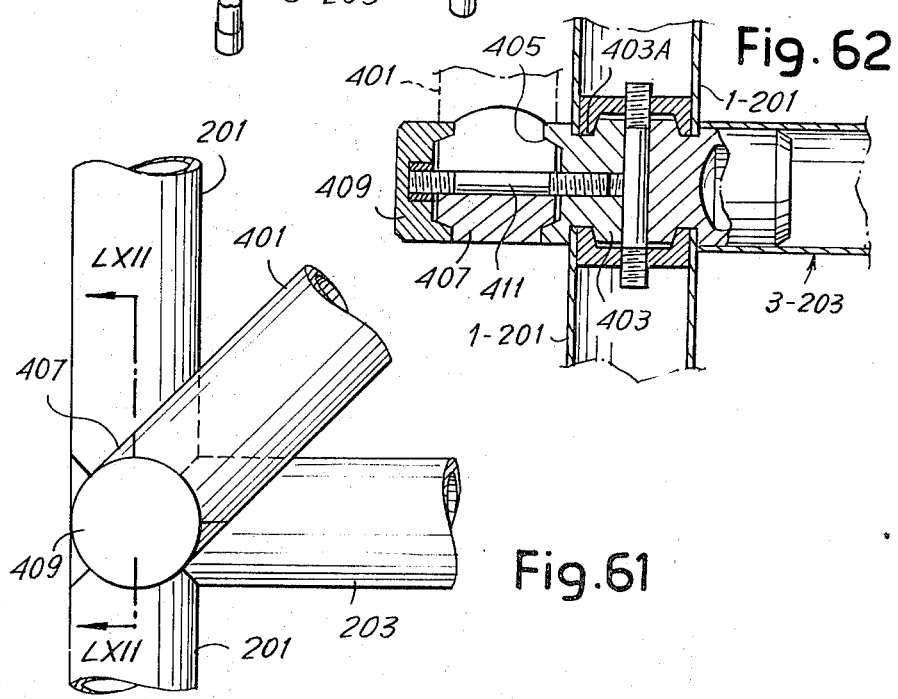
Fig. 62
Fig. 61

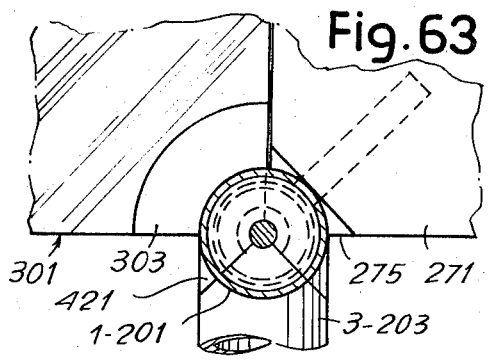
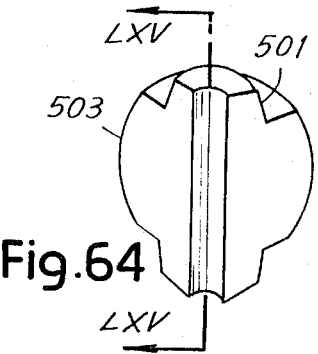
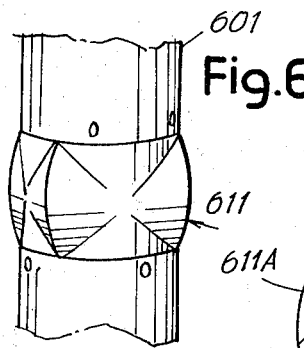
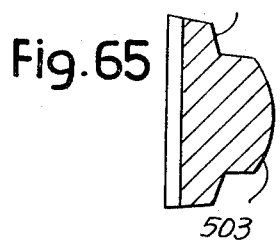
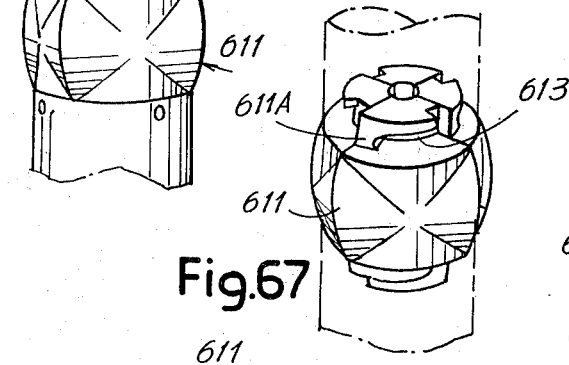
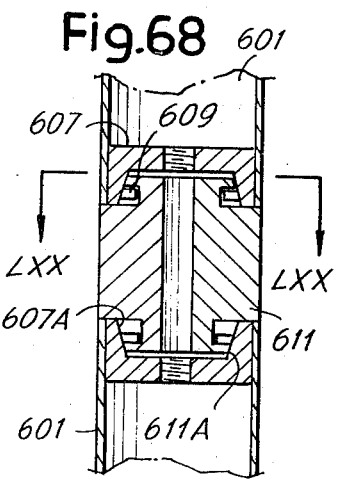
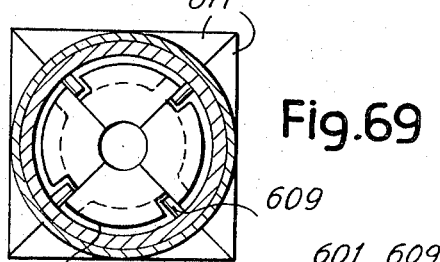
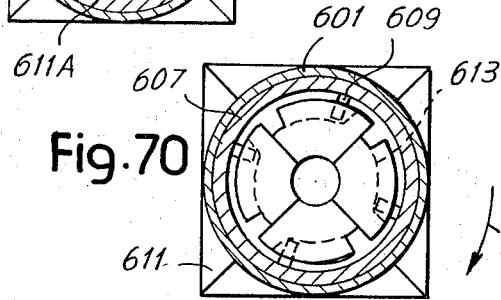
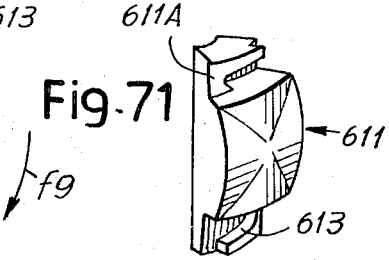

3,873,219

DEMOUNTABLE STRUCTURE

FIELD OF THE INVENTION

The present invention relates to a demountable structure, for example for forming shelf assemblies, centered and reticular assemblies, furniture, boxes, scaffolding, display or decorative assemblies, or for use as a constructional toy.

SUMMARY OF THE INVENTION

According to the present invention, there is provided in a demountable structure first and second co-axial connection members each having a circumferential edge portion, the edge portion, of one of said members being spaced from and facing the edge portion of the other of said members, a connection element interposed between the spaced edge portions, and means clamping the spaced edge portions in engagement with the connection element.

The connection members can be clamped by screw means coaxial with the edge portions.

In one preferred embodiment for use as a shelf assembly, the structure includes horizontal structural elements at several levels, supported by upright connection members between which the elements are interposed.

The structural elements can be formed by rods or by solid or tubular cross-members of various cross-sections, the elements being rectilinear or arcuate.

A cage structure formed with upright connection members and horizontal rods can be combined with panels having recessed longitudinal edges which are engaged with the upright members and the horizontal rods or other cross-members which have a circular cross-section.

BRIEF DESCRIPTION OF THE DRAWINGS

Embodiments of the invention will now be described, by way of example only, with reference to the accompanying diagrammatic drawings in which:

FIGS. 8 and 9, 10 and 11, 12 and 13 and 14 and 15 are respectively plan views and side elevations of various forms of connection elements;

FIGS. 16 and 17, 18 and 19, 20 and 21 are views of filler elements and their modes of use;

FIGS. 22, 23 and 24 illustrate in horizontal section and in vertical section the manner in which panels can be incorporated in the structure;

FIGS. 25 and 26 are perspective views of a corner portion of two forms of shelf for use in the structure;

FIGS. 27 and 28, and 29 and 30, respectively illustrate in plan view and in vertical section the manner in which the shelves of FIGS. 25 and 26 are mounted;

FIGS. 31, 32 and 33 are, respectively a plan view of a corner portion of another form of shelf, a section taken on line XXXII—XXXII of FIG. 31 and a section corresponding to line XXXIII—XXXIII of FIG. 31 of a modified form of shelf;

FIG. 34 is a perspective view of a modified form of connection element;

FIG. 35 is a vertical section of another form of connection element;

FIG. 36 is a perspective view of an integral rod and connecting element;

FIGS. 37 and 38 is a section and an external view, of a connection between two members, which may be centered members;

FIGS. 39 and 40 show a filler element for use with the connection element shown in FIGS. 31 to 34;

FIGS. 41 and 42 illustrate a connection between inclined members;

FIGS. 43 and 44 show forms of a reticular structure;

FIG. 45 is a modified form of the arrangement shown in FIG. 5;

FIGS. 46, 47, 48 and 49 are respectively a perspective view, a vertical section, a section taken on line XLVIII—XLVIII of FIG. 47, and a section taken on line XLIX—XLIX of FIG. 48 of a modified form of connection element;

FIGS. 50, 51, 52 and 53 are respectively a plan view, a view in the direction of line LI—LI of FIG. 50, and sections taken on lines LII—LII of FIG. 51 and LIII—LIII of FIG. 52 of a corner portion of a shelf;

FIGS. 54 to 58 are respectively a perspective view, sections taken on lines LV—LV of FIG. 54 and LVI—LVI of FIG. 55, a vertical section, and a section taken on line LVIII—LVIII of FIG. 57 of a connection element for a glass shelf;

FIG. 59 is a perspective view of a filler element for use with the connection element of FIGS. 54 to 58;

FIGS. 60, 61 and 62 are respectively a perspective view, a view looking in the direction of line LXI—LXI of FIG. 60, and a section taken on line LXII—LXII of FIG. 61 of a shelf assembly;

FIG. 63 is a horizontal section of a connection to which two different shelves and a horizontal rod converge;

FIGS. 64 and 65 are respectively, a perspective view, and a section taken on line LXV—LXV of FIG. 64 of a modified form of filler element; and FIGS. 66 to 71 show a modified form of coupling between upright members.

DESCRIPTION OF THE PREFERRED EMBODIMENTS

Figure 1:
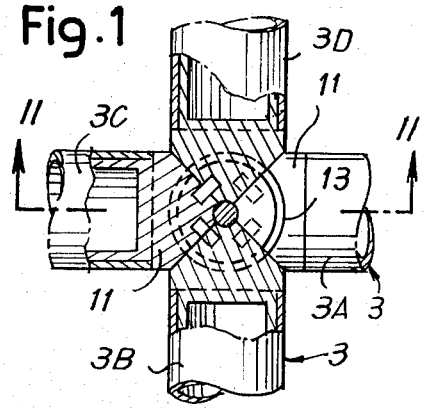
FIGS. 1, 2 and 3 are respectively a horizontal section taken on line I—I of FIG. 2, a vertical section taken on line II—II of FIG. 1 and a horizontal section takeken on line III—III of FIG. 2, showing a connection between four concurrent horizontal members in a structure in accordance with the invention.
Figure 2:
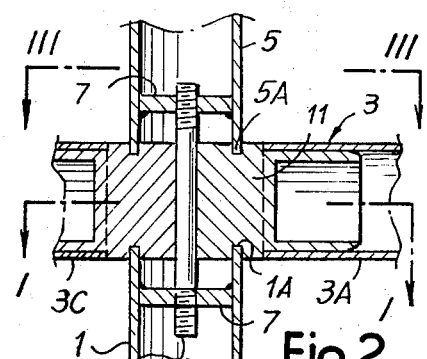
Figure 3:
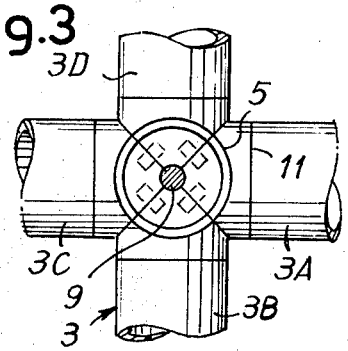
Figure 4:
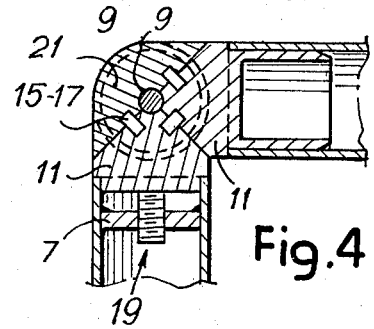
FIG. 4 is a horizontal section showing a connection between two perpendicular horizontal rods.

As shown in FIGS. 1 to 5 of the accompanying drawings, denotes a tubular upright connection member or post towards the upper end of which horizontal rods or other cross members, variable in number from one to four, converge; for example four horizontal rods 3A, 3B, 3C, 3D are shown to converge towards the member 1 in FIGS. 1 to 3; 5 denotes a second tubular upright connecting member or post (FIGS. 1 to 3) coaxial with the member 1 and superimposed on the connection.

The upright members 1 and 5 have adjacent each of their ends, a baffle or partition 7 secured by welding to the inner surface of the member. The partitions 7 each have a central threaded hole for engagement by a threaded stem or stud 9. The stem 9 can be formed for instance at the upper end of one upright member and be screwed in the lower partition 7 of an overlying upright member. The stem 9 can be locked by clamping one of the threads, or by welding; locking by clamping the threads is preferred in order to avoid damage to the projecting thread of the stem during transport and subsequent handling of the upright members the stem being locked upon subsequent assembly. The members 1 and 5 have end edges 1A and 5A projecting beyond the partitions 7.

In order to provide a connection for one or more horizontal rods such as those denoted by 3A to 3D, on the upper end of an upright member and between two upright members such as those denoted by 1 and 5, each horizontal rod has a connection element in the form of an end fitting 11 (see also FIGS. 8 and 9) which has upper and lower arcuate grooves 13 having a diameter corresponding to that of the edges 1A and 5A of the upright members 1 and 5, which in turn may correspond to the diameter of the horizontal rod. A locking pin 15 extends from one of the inclined surfaces 11A of the fitting 11, the other inclined surface having a seat 17 to receive the locking pin of an adjacent end fitting. The edge of the fitting is chamfered, to accommodate the stem 9. The end fittings 11 of the horizontal rods or other cross-members are locked onto the ends of said rods or cross-members, by being a force fit thereon, by welding or in any other appropriate manner, for instance using a system such as that designated 19 in FIG. 4, which is similar to the connection system between upright sections, that is, with a baffle or partition similar to the one 7 fixed on the horizontal rod and engaging a threaded stud extending from the end fitting.

In the connection zone of the four horizontal rods or cross-members 3A to 3D as shown in FIGS. 1 to 3, the angularly displaced surfaces 11A of adjacent end fittings 11 are contiguous, the grooves 13 defining upper and lower annular channels capable of accommodating the edges of the upright members (see FIG. 2), while the chamfered edges of the fitting define a passage for the stem 9. In practice, the fittings 11 will be engaged on the end of the lower upright member 1 and then the upper upright member 5 is engaged over the fittings 11, the two upright members being secured by the stem 9 that is previously screwed into the partition 7 of one of the aforesaid members. With the connection of the upright members 1 and 5, the edges 1A and 5A thereof lock the horizontal rods or cross-members, a firm connection being formed.

The end fittings 11 can also be used in arrangements in which less than four horizontal rods or cross-members converge towards the connection. In such arrangements, filler elements can be used to fill the otherwise vacant zones, for example filler elements such as those denoted by 21 or 23 or 25 (FIGS. 16 and 17; 18 and 19; 20 and 21) for use respectively with a connection of two, three or one single horizontal rods. These filler elements either have arcuate grooves or shoulders to be engaged by the edges of the upright members whereby to ensure a firm positioning of the concurrent horizontal rods or cross-members. Also, the filler elements have recesses for the stem 9 and pins and retaining seats similar to those denoted by 15, 17.

Instead of using filler elements, the end fittings can have a shape different than that of the end fittings 11 in which the mating surfaces are angularly displaced by 90°; in FIGS. 10 and 11 and end fitting 27 has mating surfaces 27A displaced by 180°, whereby the two mating surfaces are coplanar; in FIGS. 12 and 13 an end fitting 29 has mating surfaces 29A displaced by 260°. In FIGS. 14 and 15, an end fitting 31 is provided for the connection of one horizontal rod only and comprises a cylindrical head 31A, a pair of annular grooves 31B (the outer walls of which are omitted along part of their length) and a bore 31C for the stem 9.

Figure 5:
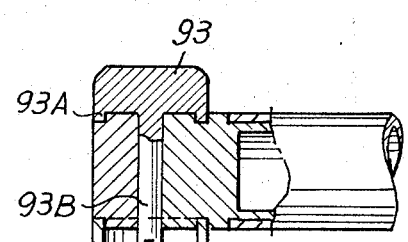
FIG. 5 is a vertical section showing a connection between a horizontal member and an upright member.
Figure 6:
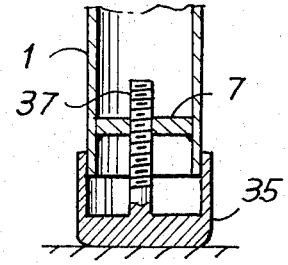
FIGS. 6 and 7 are fragmentary vertical sections of modified forms of the upright member shown in FIG. 5.
Figure 7:
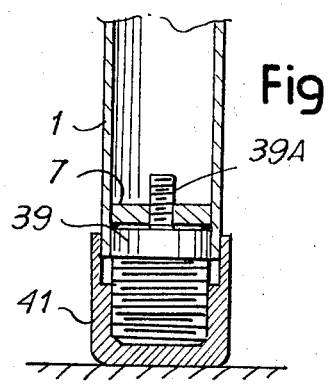

FIGS. 5, 6 and 7 show different forms of an adjustable support assembly which supports the lower upright member on the floor. According to FIG. 5, a foot 35 is provided with a threaded leg 37 similar to the stem 9 to be engaged in an adjustable manner in the lower baffle or partition 7; as shown in FIG. 6, a stud 37A, formed of a different material with respect to that of the foot, is engaged to the foot 35A. As shown in FIG. 7, a stud 39A of a member 39, which abuts the baffle or partition 7, is screwed into the baffle or partition 7; the member 39 has a large diameter thread which is stronger than that of a stud 37 or of a stem 9, to which thread a foot 41 is engaged in an adjustable manner.

With the above described elements, it is possible to obtain a cage-like frame, which can be readily assembled and disassembled and is well finished aesthetically. Means for supporting objects can be combined with the frame or the frame can carry suspended objects. If it is desired to limit the spaces defined by the frame, by means of panels arranged to form recesses, it is possible to mount on the frame, horizontal and vertical panels such as those indicated by 43 and 45 in FIGS. 22, 23; these panels can be engaged to tubular upright members and cross-members, the edges of the panels having longitudinal recesses with a profile corresponding to that of the upright members and cross-members. The panels can be incorporated either by resiliently deforming the panels or by locating the panels as the frame is formed. As shown in FIG. 24, panels 47 having a thickness which may reach or exceed the diameter of the upright members 1 or 5 or of the cross-members 3, are engaged to the cross-members 3 and/or to the upright members 1 or 5, the corner portions of the panels 47 being chamfered at 45°.

In order to provide a system of shelves, flat planks can be used in place of the horizontal rods. For this purpose, the planks have at their corners, connection elements similar to the end fittings of the rods with arcuate grooves arranged to engage the edges 1A and 5A of the upright members. Arrangements of this kind are shown in FIGS. 25 to 30.

According to FIGS. 25, 27 and 28, planks which form shelves 51 converge towards a connection between the upright members 1 and 5. Each shelf has adjacent its corner, arcuate grooves 53, by which the shelf can be engaged with the edges of the upright members 1 and 5. The upright members are connected with one another by screw stems 55 similar to the stems 9 and engaged with partitions or baffles 7. In this embodiment, the shelves 51 have corners 51A and thus the corners of adjacent shelves must be spaced from one another by an amount dependent upon the dimensions of the cross-section of the stem 55, the corner-contacting portion 55A of the stem being of reduced cross-section. In order to avoid a further reduction in the cross-sectional dimensions of the stem, and to permit the corners to lie closer together or even in contact, the corners can be chamfered as shown in FIG. 26.

According to the embodiment of FIGS. 26, 29, 30, a shelf 61 has a connection element in the form of a reinforced portion 63 at its corners to increase the strength of the corners, even if the shelf is made from a relatively weak material. The portions 63 can be fixed to the shelf 61 by means of tenons 63A or by fixing studs and are provided with arcuate grooves 65 corresponding to the grooves 53 and with a chamfer 63B at the corner, whereby the adjacent portions 63 can lie in contact.

In both shelf systems described, the shelves are engaged with the upright member and form horizontal structural elements. Four shelves or a smaller number of shelves can converge towards an upright member, in the latter case filler elements such as those of FIGS. 17, 19 or 21 can be used.

As shown in FIGS. 31 to 33 a plank 71 or 73 has at its corners a built-in connection element 75 arranged to engage the upright members and is formed similarly to the end fittings 11 or to the portion 63, and in particular is provided with an arcuate groove 77 for engagement with the edges of the upright members. The elements 75 have a spigot 78 arranged to penetrate into the thickness of the plank 71 or 73 to be anchored by friction and/or by an adhesive; the spigot 78 can have longitudinal shoulders to facilitate anchoring. Flanges 79 can be provided to flank the plank 71 or to penetrate into the thickness of the plank 73 (this plank having a greater thickness) whereby to stabilize the element 75.

In this embodiment, instead of providing pins 15 and corresponding seats 17, one side of the element 75 has a rib 87 of dovetail section and the other side of the element has a groove 89 also of dovetail section and parallel to the rib 87. Thus, the adjacent elements 75 can be engaged by relative vertical motion whereby the rib 87 of one element 75 engages in the groove 89 of an adjacent element. The resulting connection is easier to achieve and more stable than that obtained by the pins 15 of previous embodiments. The ribs 87 can, however, be omitted.

An end fitting similar to the end fitting 11 and having a rib and groove 87, 89 is shown in FIG. 34.

There is illustrated in FIG. 35 a method of connecting an inclined member to an upright member. In FIG. 35, 91 denotes an upright member to which can be combined a similar co-axial overlying member or (as shown) a cap 93, an identical cap being shown in FIG. 5; such a cap has a circular rim or edge 93A and a stud 93B, arranged to be screwed into a baffle 7 of the upright member. The rim or edge 93A engages within an annular groove formed by the elements which converge towards the upright member.

In FIG. 35 an inclined tubular element 95, has an end fitting 97 with an inclined spigot 97A engaged therein, and a head similar to that of the end fittings 11 or 13.

In FIG. 36, there is shown an end portion 101 of an integral cross-member formed in solid wood or in a plastics material for example. The end portion 101A is shaped similarly to the end fitting 85 of FIG. 34, and has a dovetail section rib 101B and corresponding groove 101C.

In FIGS. 37 and 38 there is shown a connection between two co-axial elements 110, 112 which may be rectilinear or arcuate (as shown). The elements are provided with end fittings 114 and 116 similar to those described above. The end fittings are connected by means of elements 118, 120, similar to the cap 93 (FIGS. 4 and 35), with an annular edge 118A, 120A similar to the edge or rim 93A and having the same function as that of the edges 1A, 5A of the upright members; the two elements 118 and 120 are connected by means of a stud 121 similar to that denoted by 93B and having a function similar to that of the stems 9; the stud 121 is engaged for instance in the element 118 and is screwed into a nut or threaded bush 120B incorporated into the element 120. In the arrangement of FIGS. 37 and 38, filler elements 23 (see also FIGS. 18 and 19) are used in conjunction with the end fittings.

Connection means such as that shown in FIGS. 37 and 38 can be used for centering or for forming substantially or partially reticular structures.

In order to obtain reticular structures wherein the converging elements have inclinations different than 90°, filler elements are used having an angular development different from that of the filler elements previously described. For example there can be provided filler elements 122 having an angular development of 45° as shown in FIGS. 41 and 42, or filler elements 123 having a development of 135° as illustrated in FIGS. 39 and 40. Such elements can also be used in the arrangements described and illustrated in FIGS. 1 to 34, and FIGS. 37 and 38.

To form reticular structures (for instance hexagonal or triangular structures), the component elements of the structure can have integral end fittings with surfaces displaced by an angle other than 90°. In FIGS. 43 and 44, the component elements are inclined by angles of 60°, or 120°; 124 denotes end fittings for rectilinear or arcuate or centered tubular component elements which are relatively inclined by 60°, and end fittings 126 are used with component elements relatively inclined by 120°.

It is possible to form structures of any kind with rectilinear elements; and with arcuate elements it is also possible to obtain reticular arcuate or bulging structures.

According to FIGS. 45 to 49, the arcuate grooves in the end fittings or like elements have converging side walls which engage a similarly shaped edge of an upright member or cap to provide a more secure connection.

In particular 201 denotes an upright member and 203 denotes horizontal tubular rods provided with end fittings 211. Baffles or partitions 207 are secured in the end portions of the upright member 201. The partitions 207 have an annular rim with a conical inner wall 207A which diverges towards the adjacent edge of the upright member, the edge of the rim being aligned with the edge of the upright member. The partitions 207 are also threaded to receive a threaded stem 209 to provide a connection in a similar manner to that described previously. The end fittings 211 are a force fit and/or welded into the ends of the rods 203 and have a chamfered corner to permit its engagement with other end fittings and/or with filler elements such as that denoted by 221 (FIG. 45). Each end fitting 211 has two opposed arcuate grooves 213 having a diverging conical inner side wall 213A corresponding to the side wall 207A; the outer side wall of the grooves 213 can be discontinuous, of reduced height, or omitted.

By the described arrangement, the threaded stem 209 forces the rim of the partition and the rim of a cap 293 against the end fitting 211 thus ensuring a firm connection by cooperation of the conical walls 207A, 213A.

The lower partition 207 can be combined in a similar manner as in the previous cases, with a foot member 235 (FIG. 45).

In the embodiment of FIGS. 50 to 53, a small shelf 271 is provided at the corners with an insert element 275 having angularly displaced surfaces and a conical side wall 277 similar to the wall 213A. The element includes a spigot 278 that is inserted into the corner portion of the shelf, the spigot lying on the bisector of the corner portion. The element 275 can suitably be reinforced by a core, for instance a metal core, contained in a body of synthetic resin. The spigot 278 can be suitably anchored to the material of the shelf 271.

FIGS. 54 to 58 illustrate an embodiment for a small shelf 301 made of glass or crystal sheet, and having corner fittings 303. Each of these corner fittings is in the form of a bracket with a slot 303A to accommodate the thickness of the shelf 301, and is moreover provided with a conical side wall 303B which acts similarly to the walls 227 and 213A. As shown in FIGS. 57 to 59 the corner fitting 303 is combined with a filler element 305 developed for a 270° angle, the surfaces of the fitting 303 being displaced by 90°. The fitting 303 can be combined with other similar fittings and/or with horizontal rods and/or with filler elements other than the element 305.

FIGS. 60 to 62 show a structure formed from components previously described; it is clearly possible to widely modify the various combinations. It is noted from FIGS. 60 and 63 that shelves 301 and/or shelves 271 can be combined with one another and/or with horizontal rods 3 or 303; in particular in FIG. 63 it is shown how shelves of different type and horizontal rods can converge towards the same connection. Suitable filler elements will be used where necessary.

In particular FIGS. 60 to 62 show the possibility of combining with the structure having vertical and horizontal members, a diagonal member denoted by 401 and consisting for example of a tubular rod similar to but longer than a horizontal rod. Between two superimposed upright members 201 (FIGS. 61, 62) there is engaged, adjacent an end fitting 211 of a horizontal rod 203, and a filler element, an element 403 provided with a pair of grooves 403A similar to the grooves 213, and having a concave side wall similar to the wall 207A of the partition 207, and a central threaded hole. An end fitting 407 is provided at each end of the diagonal member 401 to be engaged between an annular rim of the element 403 and an annular rim of a cap 409 which are clamped together by means of a threaded stem 411 having a similar function to that of the threaded stem 209. Filler elements are combined as appropriate with the end fitting 407 around the stem 411. A reticular structure similar to that of FIG. 60 are provided using components such as 1 or 201 and 3 or 203, can be developed from the diagonal element 401. One or more fillter elements similar to an element 421 (FIG. 63) will be used where necessary.

FIGS. 64 and 65 show an element having a modified outer shape. As shown in these Figures a surface 503 extends between two opposed inclined arcuate walls 501 and follows the curvature of horizontal rods with which said element is combined, to form a continuous surface. The surface 503 has a partial toroidal development about the axis of the upright members.

FIGS. 66 to 71 show an embodiment wherein the coupling is obtained by means of bayonet joints instead of threaded stems. In this case, upright members 601 have partitions 607 with annular rims, the inner walls 607A of which are conical. Pins 609 project inwardly from the walls 607A. Between the two upright members 601 elements generally denoted by 611 are engaged; these elements can be end fittings of horizontal rods, or of shelves or even filler elements. The elements 611 have conical surfaces 611A, arranged to cooperate with the surfaces 607A in a similar manner to that described previously. Recesses 613 are formed in the surfaces 611A and extend spirally to cooperate with the pins 609. The coupling is effected by introducing the pins 609 into axial grooves in communication with the recesses 613 and by relatively rotating the members 601 in the direction of arrow $f_9$ of FIG. 70. The coupling in this case takes place with less angular movement than is necessary when using threaded stems 209. Clearly a similar arrangement can be adopted for panels or glass shelves. It will be apparent that the connections can be made with the threaded stems (e.g., the stems 9) extending horizontally or in other orientations.

What is claimed is:

1. A demountable supporting structure comprising a plurality of connection members, each of which includes an internal partition defining a threaded opening therein and an edge portion having a frusto-conical inner surface that is circular in cross-section about an axis of said connection member, a plurality of connection elements interposed between and intersecting the connection members, said connection elements having frusto-conical annular walls engaged by said inner surfaces, each connection element being formed by a plurality of segments adjoining each other along angularly displaced surfaces directed radially of said axis said surfaces carrying respective projections and recesses by which the segments are interlocked, and screw means extending transversely from the connection elements and axially into the connection members for threadedly engaging the partitions therein whereby the connection members can be secured to the connection elements and stiffened by a rotational force applied externally to said connection members.

2. The structure of claim 1, wherein said screw means comprises a one-piece integrally formed elongated stem that threadedly engages two successive connection members.

3. The structure of claim 1, further comprising a plurality of similar horizontal and vertical connection members, said connection members being generally tubular, the connection elements being interposed between the connection members.

4. The structure of claim 1, wherein the connection elements define displaced annular wall portions for engagement by said edge portions.

5. The structure of claim 1, wherein there is a plurality of connection members of equal length, a plurality of equal angles being defined between successive connection members.

6. The structure of claim 5, wherein said equal angles are each 60°.

* * * * *

UNITED STATES PATENT OFFICE
CERTIFICATE OF CORRECTION

Patent No. 3,873,219                    Dated March 25, 1975

Inventor(s)    GIANCARLO POFFERI

It is certified that error appears in the above-identified patent and that said Letters Patent are hereby corrected as shown below:

On the title page, line number 30, there is no claim for the priority of Italian Application No. 9748 of November 5, 1971; there should be such a claim.

Signed and Sealed this thirtieth Day of September 1975

[SEAL]

Attest:

RUTH C. MASON
Attesting Officer

C. MARSHALL DANN
Commissioner of Patents and Trademarks